US011881628B2

(12) United States Patent
Rubin et al.

(10) Patent No.: US 11,881,628 B2
(45) Date of Patent: Jan. 23, 2024

(54) ADDING VIRTUAL RECEIVE ANTENNAS USING SWITCHING DEVICES

(71) Applicant: Intel Corporation, Santa Clara, CA (US)

(72) Inventors: Amir Israel Rubin, Kiryat Ono (IL); Ofer Markish, Be'erotime (IL)

(73) Assignee: Intel Corporation, Santa Clara, CA (US)

(*) Notice: Subject to any disclaimer, the term of this patent is extended or adjusted under 35 U.S.C. 154(b) by 456 days.

(21) Appl. No.: 16/913,240

(22) Filed: Jun. 26, 2020

(65) Prior Publication Data

US 2021/0408697 A1 Dec. 30, 2021

(51) Int. Cl.
*H01Q 3/24* (2006.01)
*H01Q 25/00* (2006.01)
*H01Q 21/29* (2006.01)

(52) U.S. Cl.
CPC ............. *H01Q 25/00* (2013.01); *H01Q 3/247* (2013.01); *H01Q 21/29* (2013.01)

(58) Field of Classification Search
CPC ........ H01Q 25/00; H01Q 3/247; H01Q 21/29; H01Q 3/24
See application file for complete search history.

(56) References Cited

U.S. PATENT DOCUMENTS

| 9,391,688 | B2 | 7/2016 | Artemenko et al. | |
| 2005/0226176 | A1* | 10/2005 | Leenaerts | H04B 7/0604 370/315 |
| 2006/0125601 | A1* | 6/2006 | Onishi | H04J 13/00 340/5.72 |
| 2019/0044581 | A1 | 2/2019 | Lea et al. | |
| 2019/0137596 | A1* | 5/2019 | Silverman | G01S 5/06 |

FOREIGN PATENT DOCUMENTS

| KR | 20160044908 A | 4/2016 |
| KR | 20190117711 A | 10/2019 |
| WO | WO-2019050762 A1 | 3/2019 |
| WO | WO-2021262227 A1 | 12/2021 |

OTHER PUBLICATIONS

"International Application Serial No. PCT/US2020/065535, International Search Report dated Apr. 19, 2021", 7 pgs.
"International Application Serial No. PCT/US2020/065535, Written Opinion dated Apr. 19, 2021", 7 pgs.
"International Application Serial No. PCT/US2020/065535, International Preliminary Report on Patentability dated Jan. 5, 2023", 7 pgs.

* cited by examiner

*Primary Examiner* — Dieu Hien T Duong
(74) *Attorney, Agent, or Firm* — Schwegman Lundberg & Woessner, P.A.

(57) ABSTRACT

Millimeter-wave (mmWave) and sub-mmWave technology, apparatuses, and methods that relate to receivers for wireless communications are described. The various aspects include an apparatus of a communication device including an antenna array and switching circuitry coupled to each antenna of the antenna array. The switching circuitry is configured to switch at a rate based on the center frequency of incoming communications on each respective antenna to generate at least two antenna patterns and provide the at least two antenna patterns to processing circuitry for decoding.

19 Claims, 17 Drawing Sheets

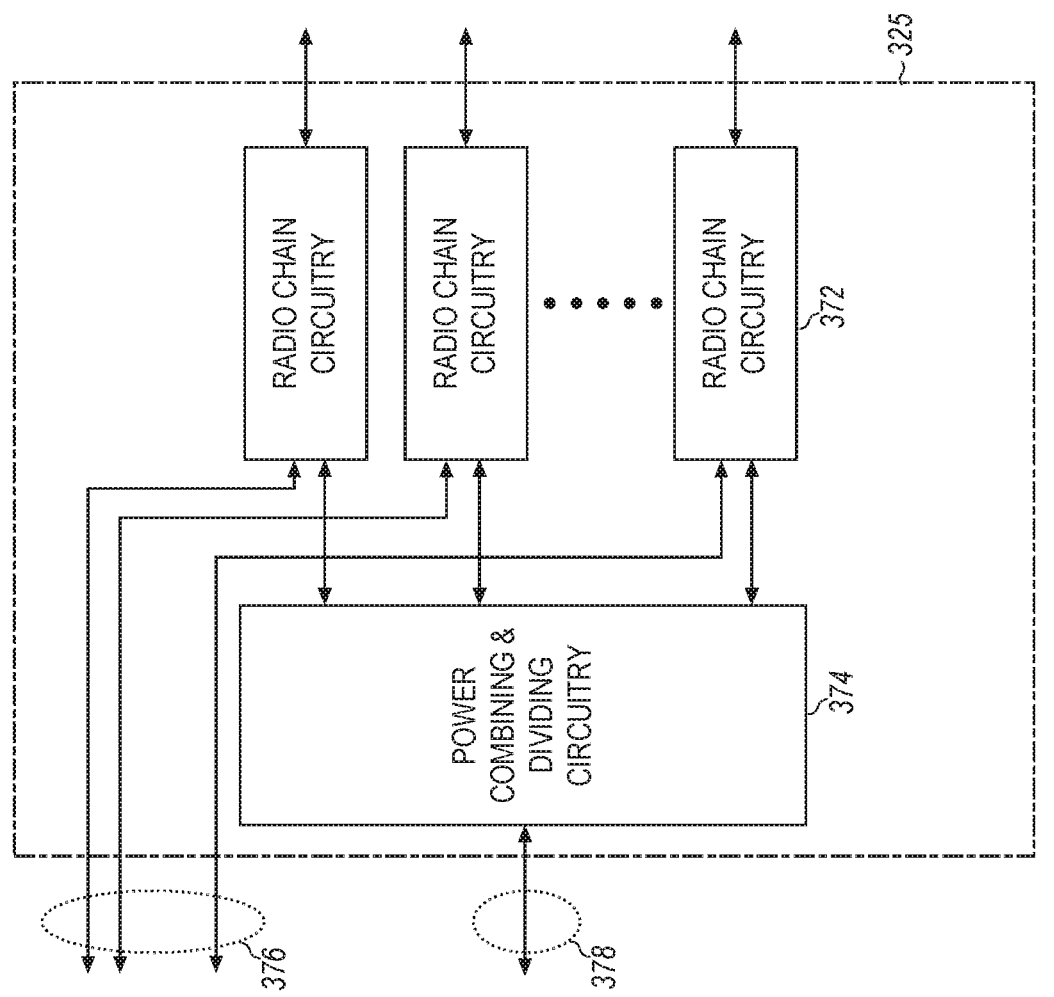

… (1) …

ADDING VIRTUAL RECEIVE ANTENNAS USING SWITCHING DEVICES

TECHNICAL FIELD

Some aspects of the present disclosure pertain to wireless communication devices (e.g., laptops, smart phones and other mobile devices) that use antennas and antenna structures for communication of wireless signals. In particular, some aspects pertain to switching antenna characteristics. Some aspects of the present disclosure relate to devices that operate in accordance with the Wireless Gigabit Alliance (WiGig) (e.g., IEEE 802.1 1ad) protocols or other 802.x protocols.

BACKGROUND

As the number and types of wireless communications increases, equipment vendors are called upon to add additional antennas to equipment in order to maintain throughput and robustness expectations of users. However, increasing the number of antennas increases equipment cost. Accordingly, there is a general need to increase the number of uses for a particular antenna to avoid the need to add additional antennas to equipment.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 3D illustrates aspects of exemplary radio frequency circuitry illustrated in FIG. 3A according to some aspects.

DETAILED DESCRIPTION

Figure 1:
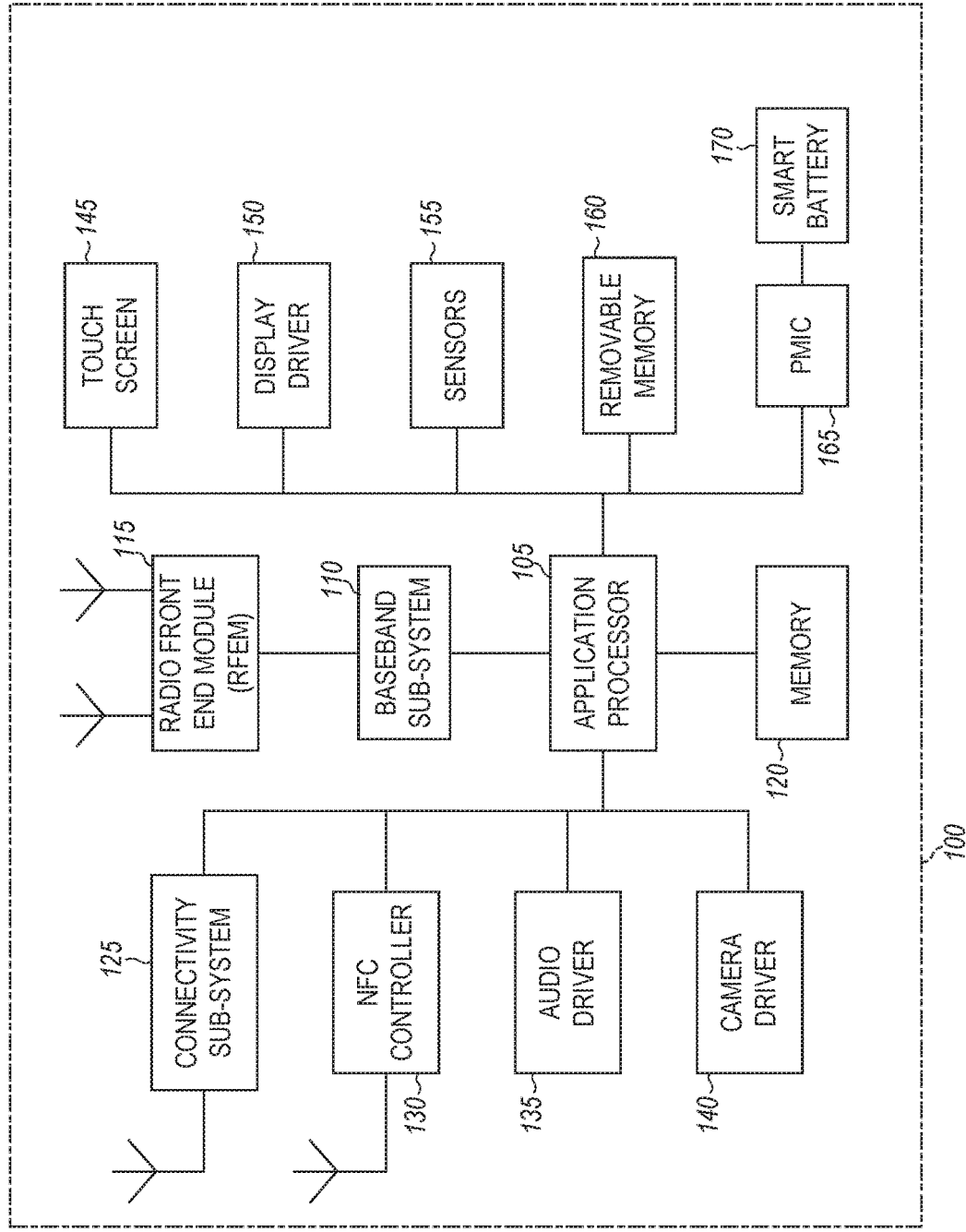
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real-time clock (RTC), timer-counters including interval and watchdog timers, general-purpose 10, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
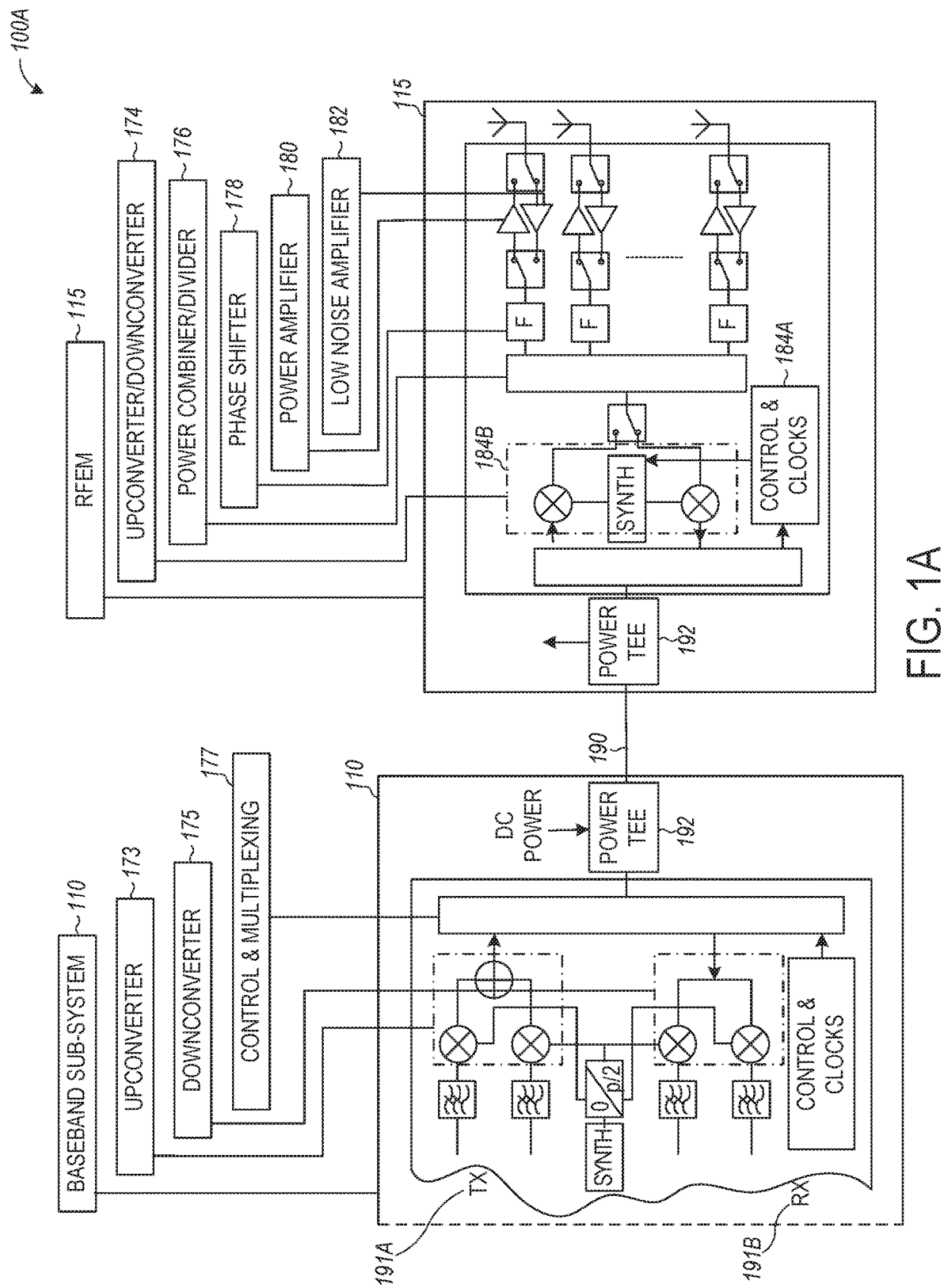
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of an analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter-wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter-wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
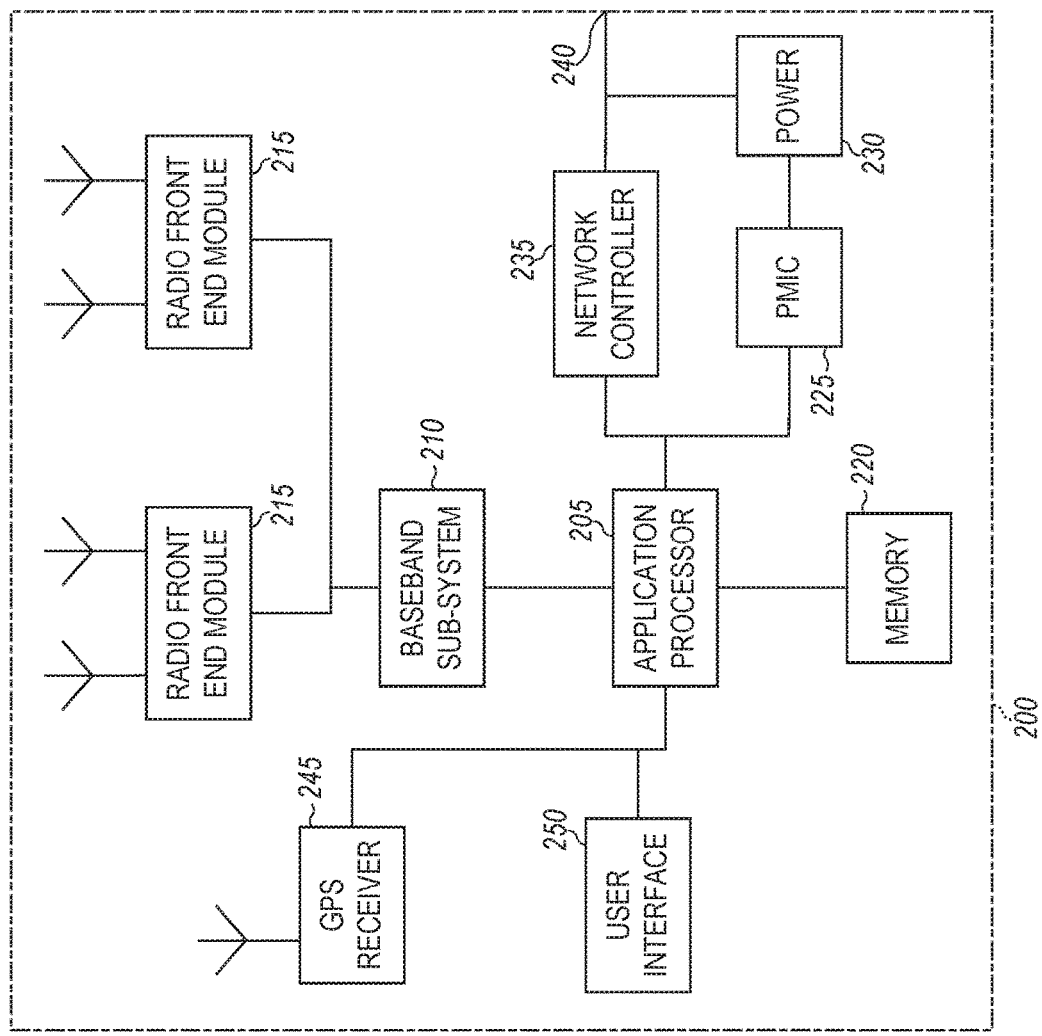
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real-time clock (RTC), timer-counters including interval and watchdog timers, general-purpose 10, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional cross-point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown-out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
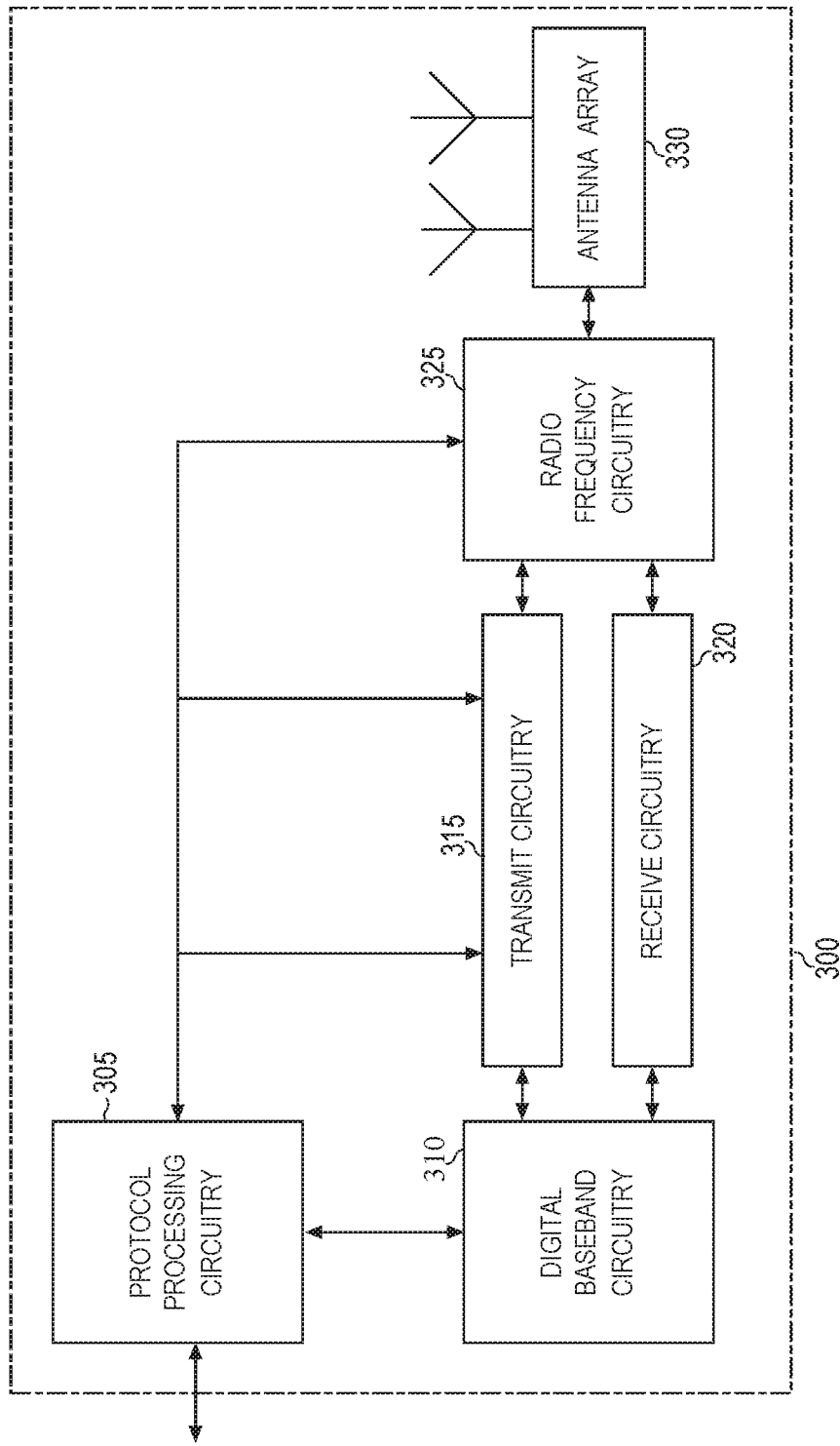
FIG. 3A illustrates exemplary millimeter-wave communication circuitry according to some aspects.
Figure 3B:
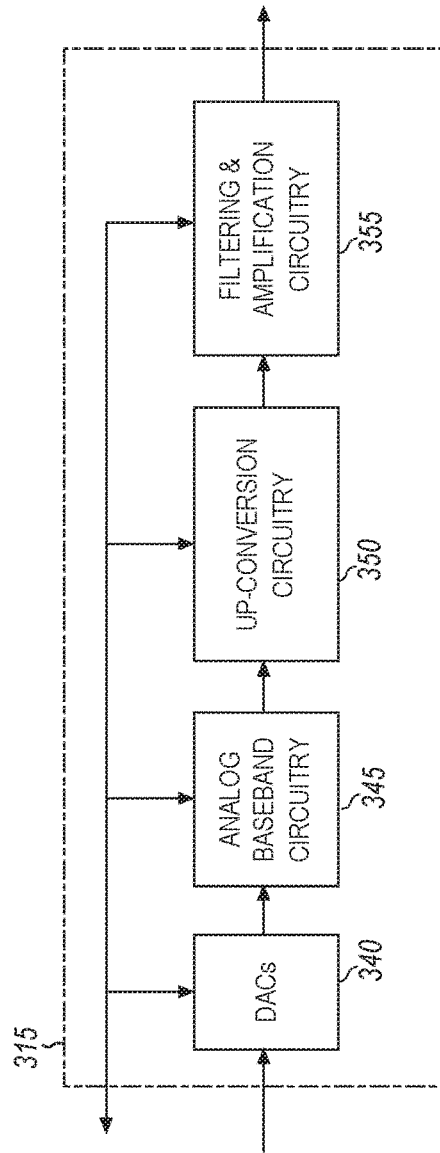
FIG. 3B illustrates aspects of exemplary transmit circuitry illustrated in FIG. 3A according to some aspects.
Figure 3C:
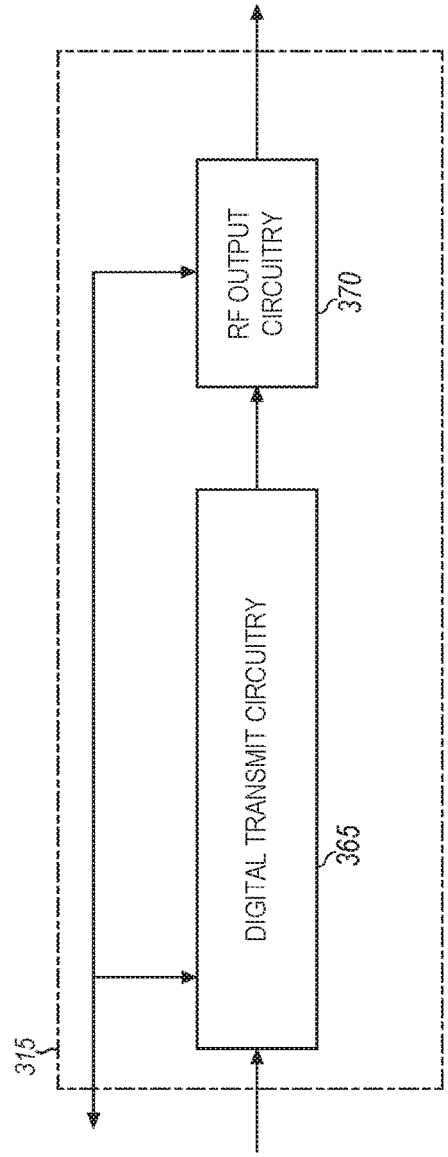
FIG. 3C illustrates aspects of exemplary transmit circuitry illustrated in FIG. 3A according to some aspects.
Figure 3E:
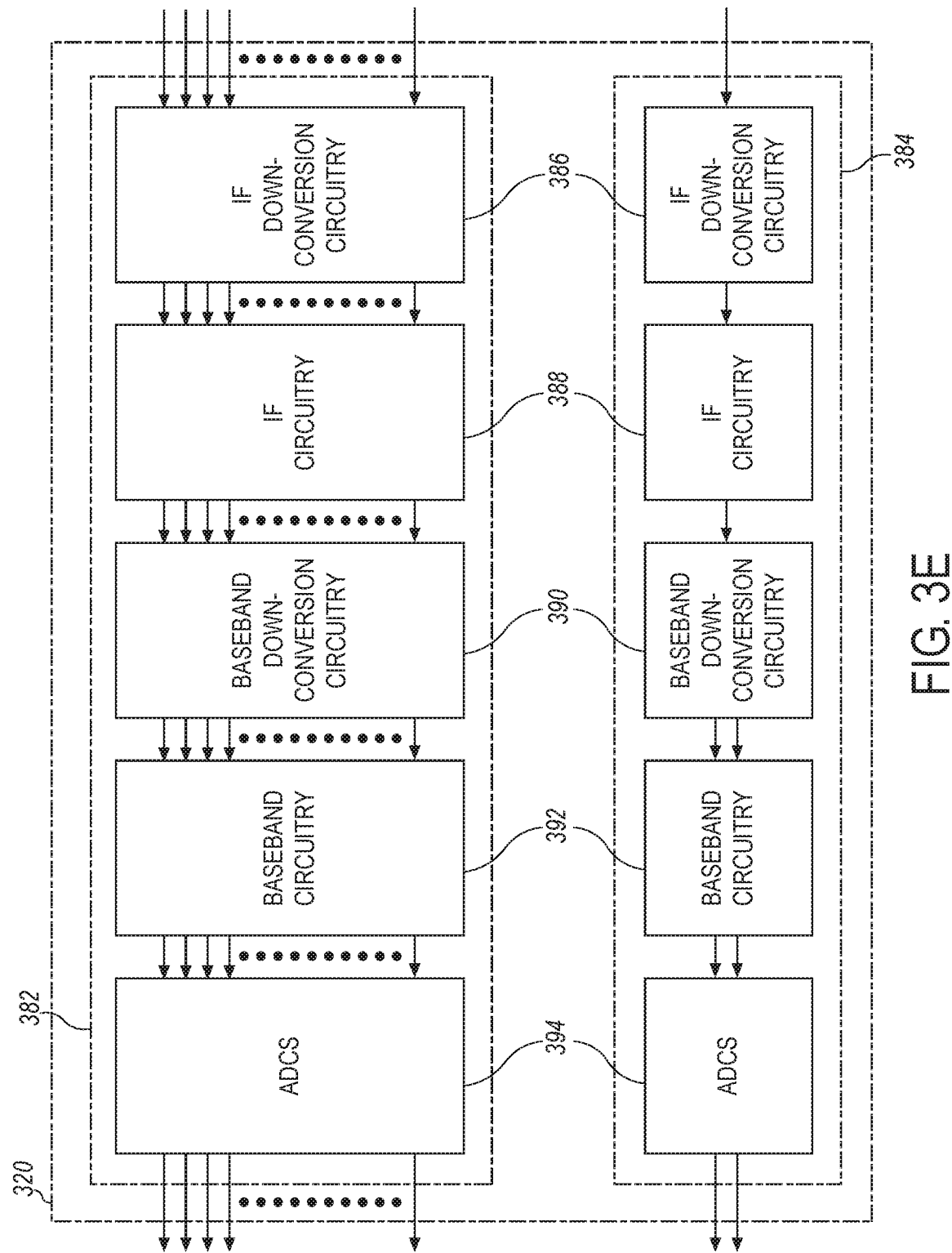
FIG. 3E illustrates aspects of exemplary receive circuitry in FIG. 3A according to some aspects.

FIG. 3A illustrates exemplary mmWave communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Millimeter-wave communication circuitry 300 shown in FIG. 3A may be alternatively grouped according to functions. Components illustrated in FIG. 3A are provided here for illustrative purposes and may include other components not shown in FIG. 3A.

Millimeter-wave communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter-wave communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter-wave communication circuitry 300 may further include transmit circuitry 315, receive circuitry 320 and/or antenna array circuitry 330. Millimeter-wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters, and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
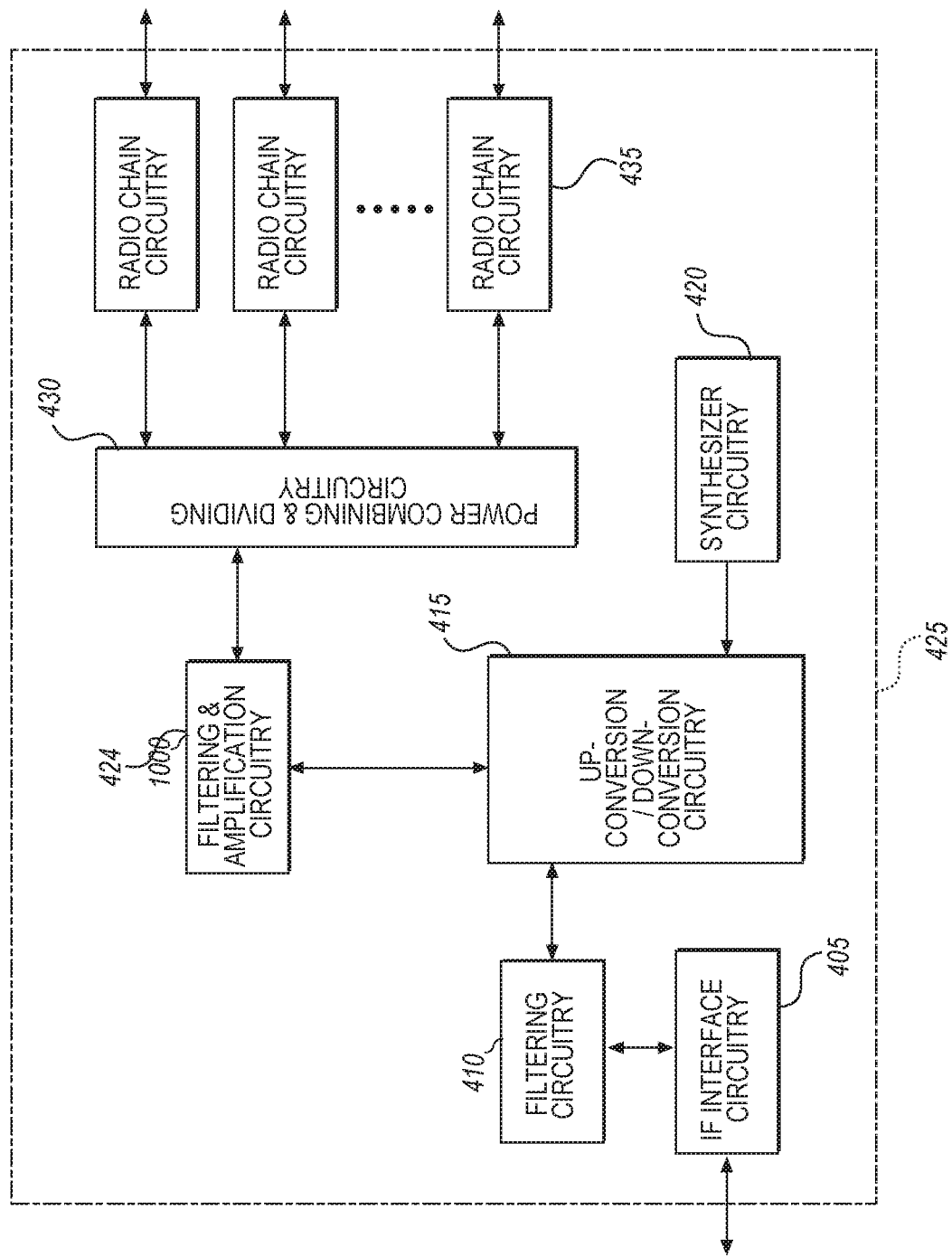
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5A:
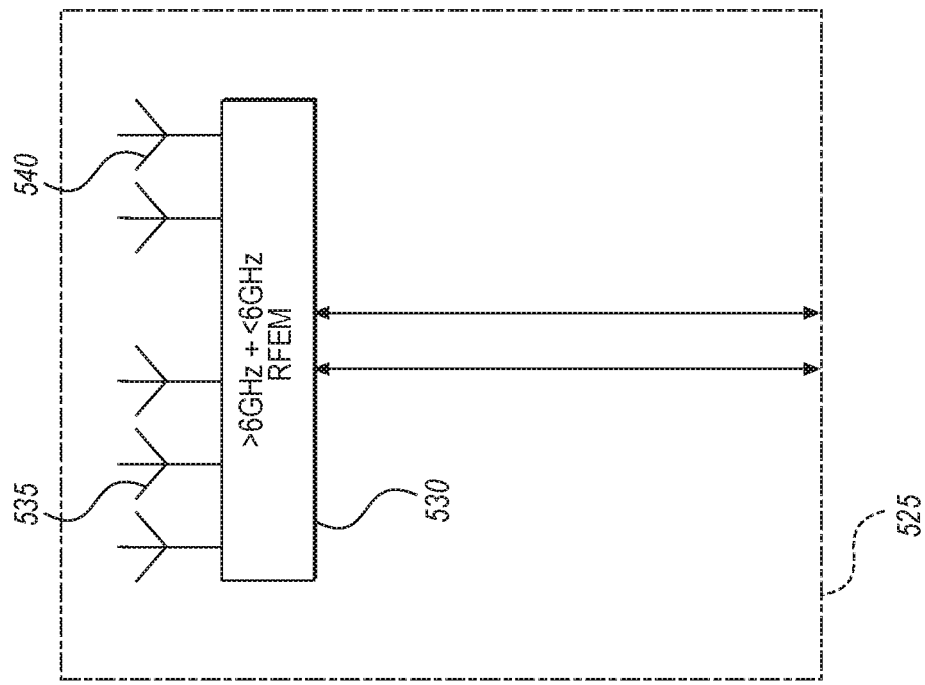
FIG. 5A illustrates an aspect of an exemplary radio front end module (RFEM) according to some aspects.
Figure 5B:
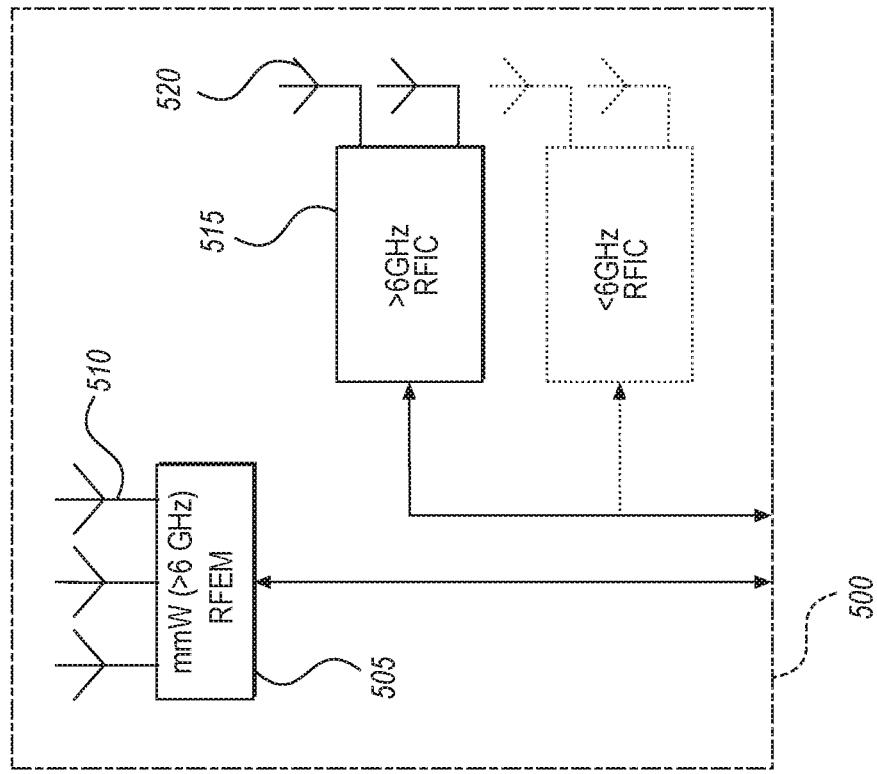
FIG. 5B illustrates an alternate aspect of an exemplary radio front end module, according to some aspects.

FIG. 5A and FIG. 5B illustrate aspects of a radio front end module useable in the circuitry shown in FIG. 1 and FIG. 2, according to some aspects. FIG. 5A illustrates an aspect of a radio front end module (RFEM) according to some aspects. RFEM 500 incorporates a millimeter-wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter-wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter-wave and sub-six gigahertz radio functions may be implemented in the same physical radio front end module (RFEM) 530. RFEM 530 may incorporate both millimeter-wave antennas 535 and sub-six gigahertz antennas 540.

Figure 6:
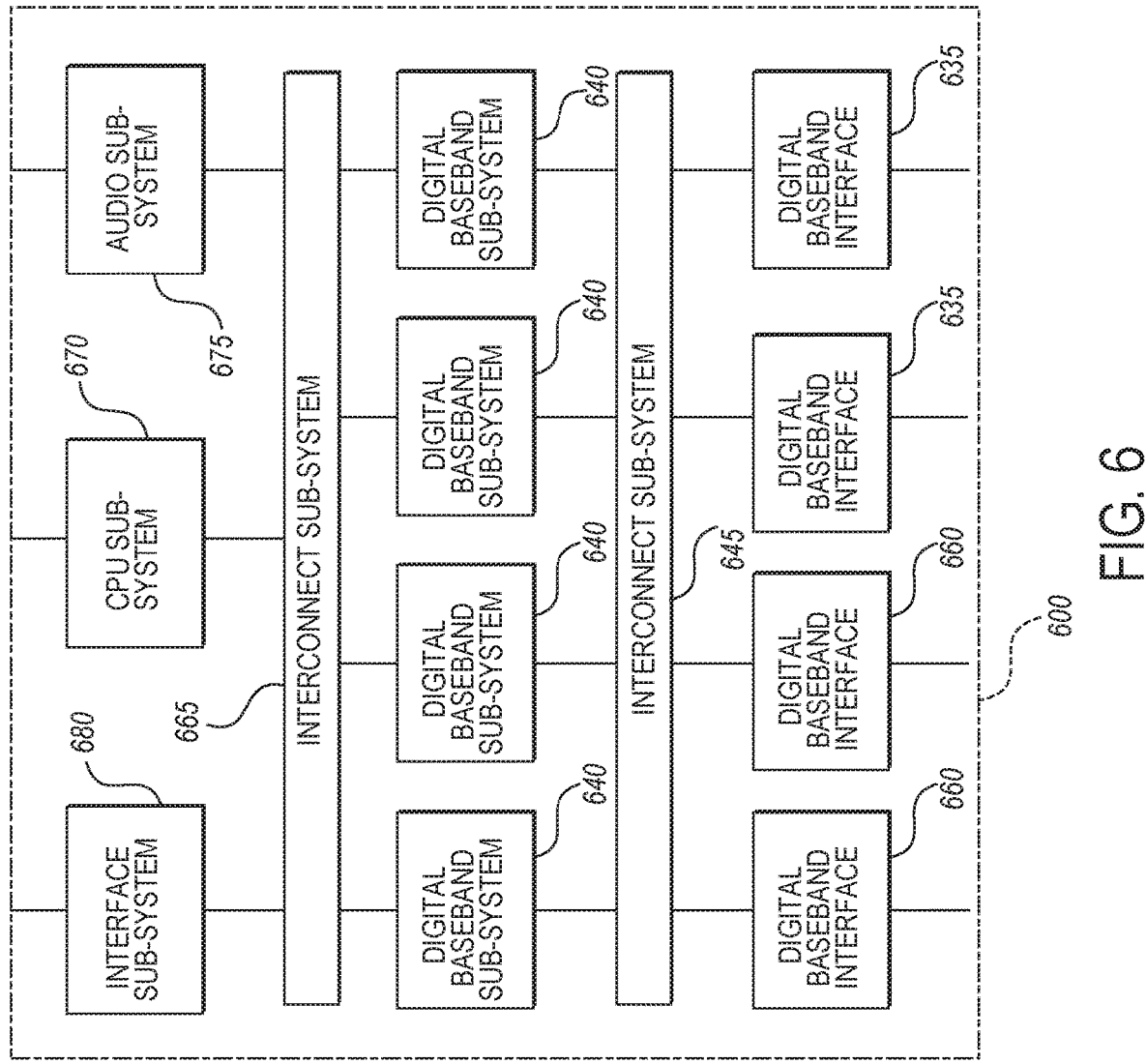
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, the baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
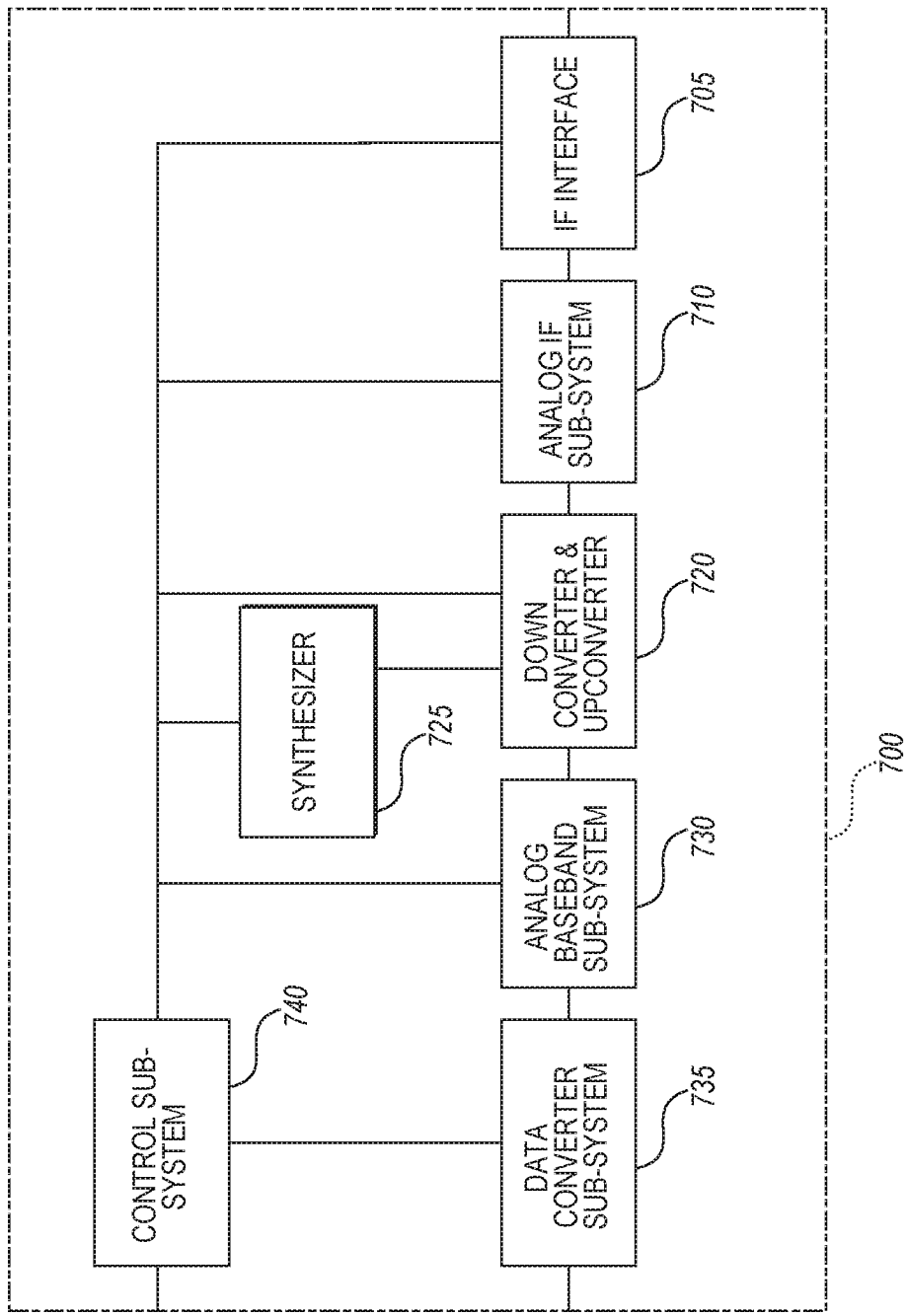
FIG. 7 illustrates an exemplary mixed-signal baseband subsystem, according to some aspects.

FIG. 7 illustrates an exemplary of a mixed-signal baseband subsystem 700, according to some aspects. In an aspect, mixed-signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
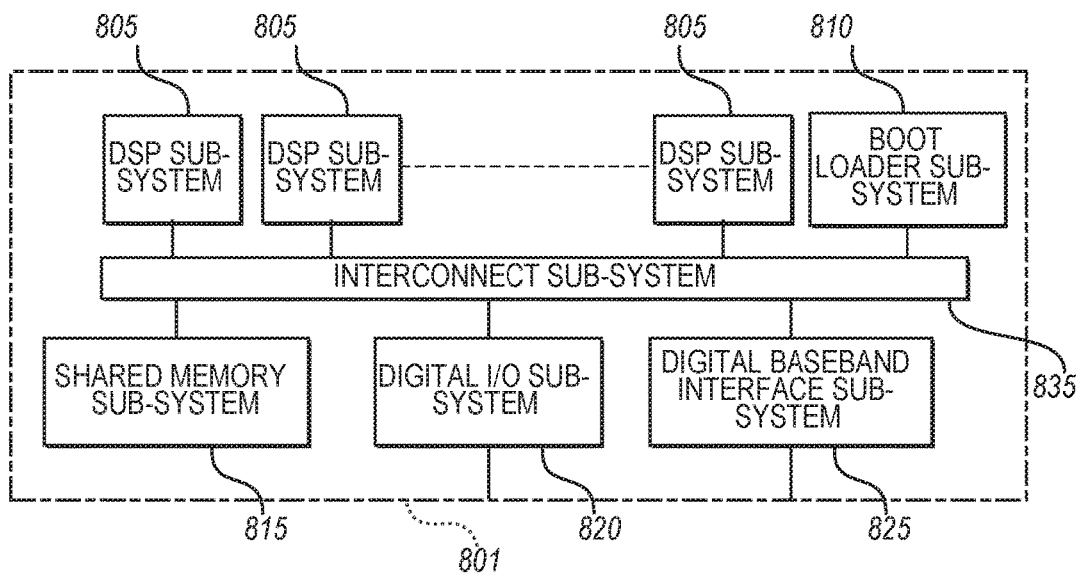
FIG. 8A illustrates an exemplary digital baseband subsystem, according to some aspects.
Figure 8B:
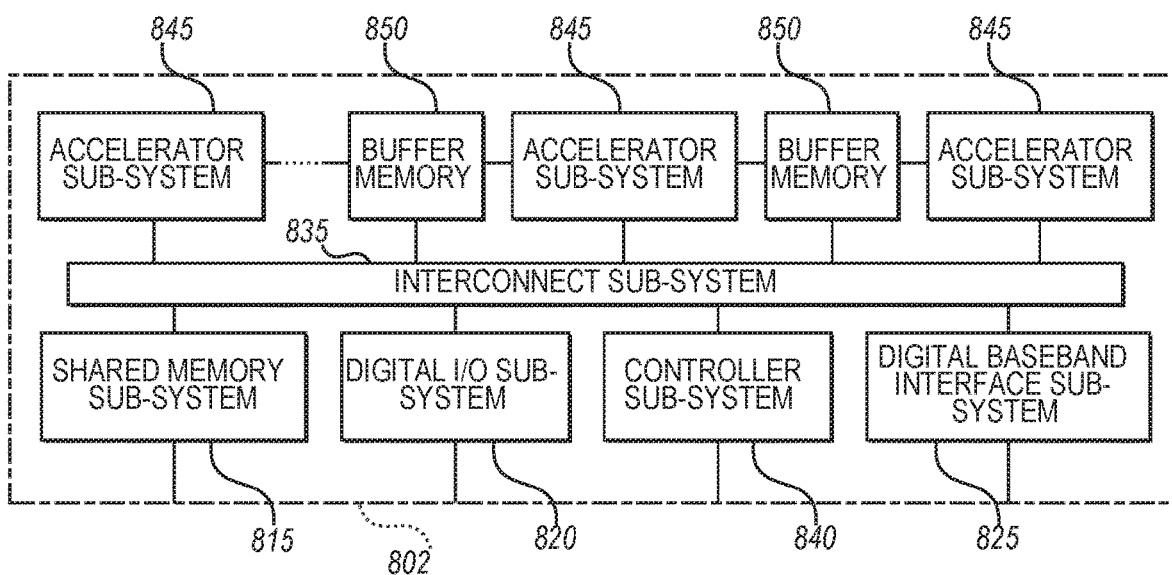
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, ... 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, ... 845N, buffer memory 850A, 850B, ... 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I²C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between the baseband processing subsystem and mixed-signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
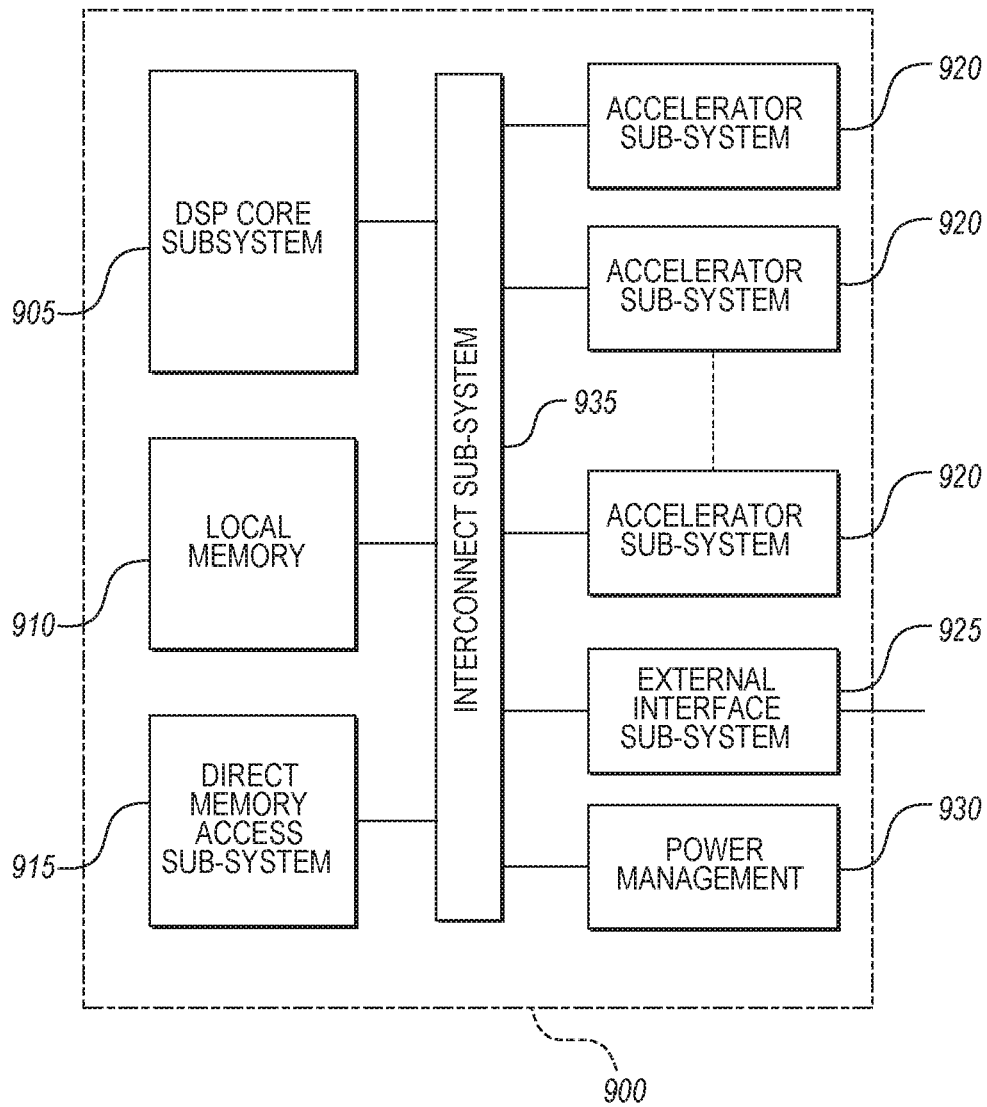
FIG. 9 illustrates an exemplary digital signal processor subsystem, according to some aspects.

FIG. 9 illustrates a digital signal processor (DSP) subsystem 900 according to some aspects.

In an aspect, DSP subsystem 900 may include one or more of each of DSP core subsystem 905, local memory 910, direct memory access (DMA) subsystem 915, accelerator subsystem 920A, 920B ... 920N, external interface subsystem 925, power management circuitry 930 and interconnect subsystem 935.

In an aspect, local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, the external interface subsystem 925 may provide for access by a microprocessor system external to DSP subsystem 900 to one or more of memory, control registers and status registers which may be implemented in DSP subsystem 900. In an aspect, the external interface subsystem 925 may provide for transfer of data between local memory 910 and storage external to DSP subsystem 900 under the control of one or more of the DMA subsystem 915 and the DSP core subsystem 905.

Figure 10A:
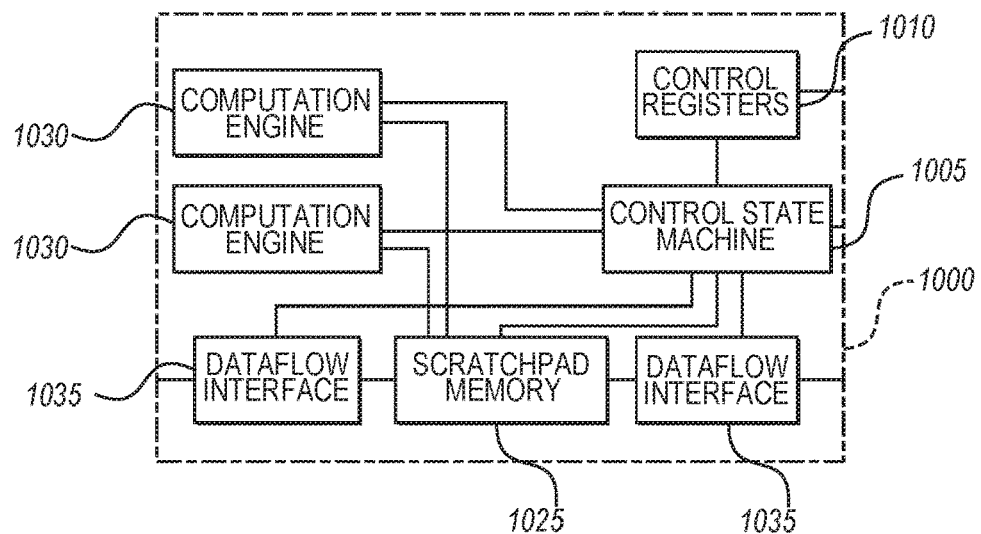
FIG. 10A illustrates an example of an accelerator subsystem, according to some aspects.
Figure 10B:
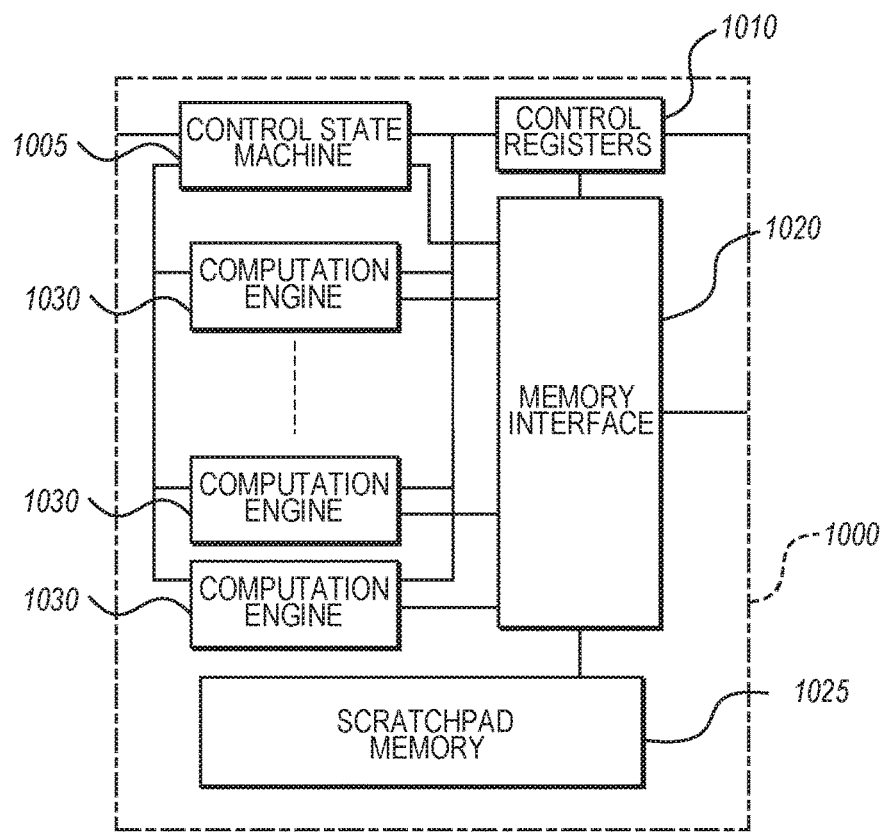
FIG. 10B illustrates an alternate exemplary accelerator subsystem, according to some aspects.

FIG. 10A illustrates an example of an accelerator subsystem 1000 according to some aspects. FIG. 10B illustrates an example of an accelerator subsystem 1000 according to some aspects.

In an aspect, accelerator subsystem 1000 may include one or more of each of control state machine 1005, control registers 1010, memory interface 1020, scratchpad memory 1025, computation engine 1030A ... 1030N and dataflow interface 1035A, 1035B.

In an aspect, control registers 1010 may configure and control the operation of accelerator subsystem 1000, which may include one or more of: enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000.

Fast Switching of Receive Antennas

Price constraints and other manufacturer constraints may limit the number of physical antennas that can be included in a user device. Nevertheless, devices should be able to receive signals from multiple directions in order to provide a robust solution to consumers. Available solutions can switch an antenna's direction pattern, providing direction diversity; however, such switching can be slow and based on long term channel conditions. Such solutions also increase overhead in that measurements must constantly be taken to select the best directions from the available directions. Stated differently, while an antenna may receive from different directions, the antenna cannot receive from all of these directions concurrently.

In contrast, systems according to some aspects can increase the effective number of antennas, providing improvements in robustness to platform noise and improvements in performance. Systems according to aspects effectively increase the number of antennas by permitting an antenna to operate effectively in different directions at the same time by fast switching of the antenna direction within each sample processed at the receiver.

Figure 11:
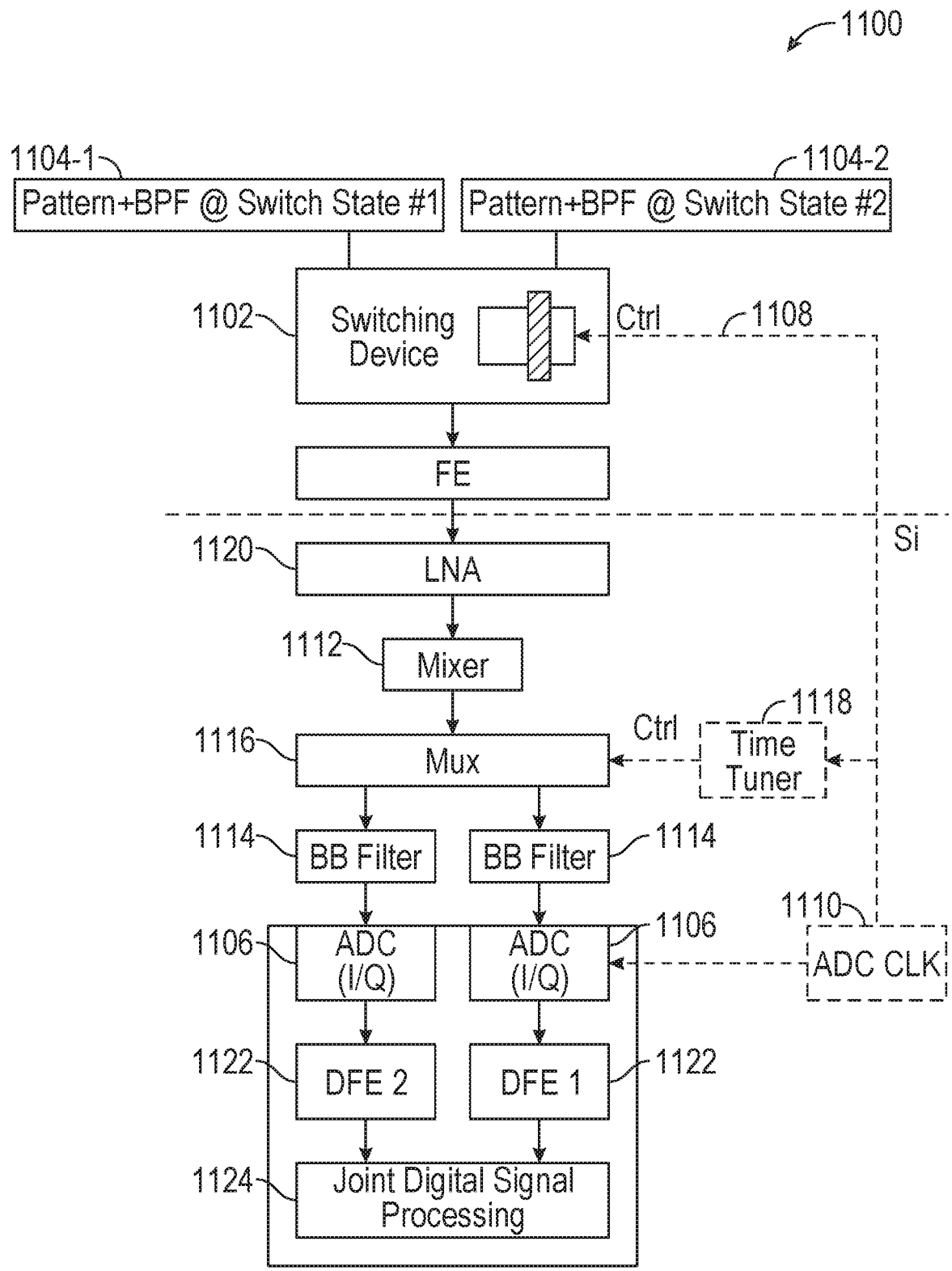
FIG. 11 illustrates an exemplary architecture for receiving two or more antenna patterns using one physical antenna according to some aspects.

FIG. 11 illustrates an exemplary architecture 1100 for receiving two or more antenna patterns using one physical antenna according to some aspects. The architecture includes a switching device 1102 in accordance with some aspects. The switching device 1102 is coupled to a wireless antenna such that changing the state of the switching device 1102 changes the antenna pattern thereby allowing for reception of multiple reception patterns from one physical antenna. The extent of difference in the antenna pattern allows diversity. While one switching device 1102 is shown, it will be appreciated that more than one switching device can be included, such that each switching device can switch one physical antenna between multiple states.

The switching device 1102 number of states determines the number of virtual antennas that can be created for each physical antenna. For example, the switching device 1102 can comprise an interface to antennas and include switching circuitry. The switching circuitry can include a simple diode or single pull double throw (SPDT) switch that can be used for two virtual chains per each actual physical chain, by simple switching between the two states of the diode/SPDT. The switching speed can vary according to the bandwidth of the signal to be received. The switching device 1102 supported switching rate can be determined by, for example, multiplying the sampling rate required for the ADC 1106 to receive the desired signal with a single physical antenna by the number of desired virtual antennas (e.g., the number of possible antenna patterns or directions) per corresponding physical antenna. For example, in order to receive in n directions (e.g., using n antenna patterns 1104-1-1104-*n*), the switching rate should be n times the sampling rate needed to receive the desired signal using the physical antenna. In aspects, when the switching device 1102 is switched to a particular pattern, the switching device 1102 should have the same frequency response or sufficiently the same frequency response as previous times at which the switching device 1102 was switched to that pattern. The degree to which frequency response should match will depend on design of the other elements in architecture 1100 and upon channel conditions such as coherency, for example. The switching device 1102 can provide antenna patterns to other circuitry, for example front end (FE) circuitry 1104.

In some aspects, a control signal 1108 controls switching device 1102 state. Because the switching of switching device 1102 is at a rate that is similar to the ADC 1106 sampling rate, the same clock source 1110 can be used for the ADC sampling rate and for switching the switching device 1102. In some aspects, the controls signal 1108 can be conveyed to the switching device 1102 over the same shielded cable connecting the wireless solution to the antenna. The control signal 1108 can be separate from signal receive lines, incorporated in signal transmit lines, or separate from either receive or transmit lines, for example. One control signal 1108 can be provided for each switching device 1102 in aspects including more than one switching device 1102.

The control signal 1108 can also be used to switch between receive paths at same rate as the switching between the two or more antenna patterns. Example paths can include components of a mixer 1112, baseband filter 1114, ADC 1106, etc. Other receive path components can be used, including digital front end (DFE) 1122, digital signal processing circuitry 1124, etc. The receive path components can be similar those shown above, for example in FIG. 1. Baseband filtering and ADC may be specified for each of the patterns so that each pattern can be processed separately. A silicon switching device, for example multiplexer 1116, can place each received pattern into a dedicated baseband filter 1114 with maximum separation. The multiplexer 1116 can be synchronized with switching device 1102 using synchronization circuitry, e.g., tuner 1118. The tuner 1118 can perform such synchronization by analyzing the correlation in the time domain or the frequency domain for the different received patterns and selecting the configuration of the switching device 1102 to optimize correlation. A chain selector block in the digital signal processing circuitry within the multiplexer 1116 can distribute ADC samples periodically in a circular manner to each of the receiver chains handling the samples for each virtual antenna. Joint digital signal processing of samples from all virtual antennas can be performed using digital signal processing circuitry 1124.

The BB filter 1114 can filter the down-converted signal generated at the output of the RF chain, considering the frequency domain replicas of the actual signal. These replicas are in the frequency domain around integer multiplications of the switching rate, which is equal to the ADC sampling rate.

The ADC 1114 in some aspects should be capable of capturing a signal having a bandwidth corresponding to a sampling rate as described above, in other words, a sampling rate equal to a switching rate of the switching device 1102 divided by the number of virtual antennas per physical antenna.

A chain selector can be included within digital signal processing circuitry 1116. Multiplexer circuitry 1118 an distribute ADC samples periodically in a circular manner to each of the receiver chains handling the samples for each virtual antenna.

The switching device 1102 can be coupled between a front end 1104 (similar to, for example, RFEM 115 (FIG. 1) and antennas to effectively switch antennas between different pattern directions 1106, 1108. The addition of the switching device should be in a manner that different states of this device should lead to different pattern directions 1106, 1108 of an antenna associated with the switching device 1102.

At ADC 1118 output, samples can be separated based on their respective antenna pattern and ADC samples can then be processed as if coming from different antennas. Frequency response for switches should be substantially repeatable, such that, for example, a frequency response at a given antenna pattern is substantially the same each time that antenna pattern is selected. The acceptable ranges for frequency response will vary based on channel conditions, digital design of the system, and other factors.

In addition to spatial switching described above, aspects can also perform frequency switching. Frequency switching will typically occur at slower rates than spatial switching. Frequency switching can be performed, for example, to accommodate reception of Wi-Fi signals.

Other filtering, such as bandpass filters, etc., can be added to the architecture 1100. For example, the switching device 1102 may generate spurious signals appearing as an impulse train in the frequency domain. Bandpass filters therefore may be applied. Noise can also be reduced or eliminated by use of dedicated cables/wires for switching device 1102. Such filtering can also remove other spurious signals, thermal noise, etc. Such filters can be added after the low noise amplifier (LNA) stage 1120, after mixer 1112, or other locations in silicon.

Figure 12:
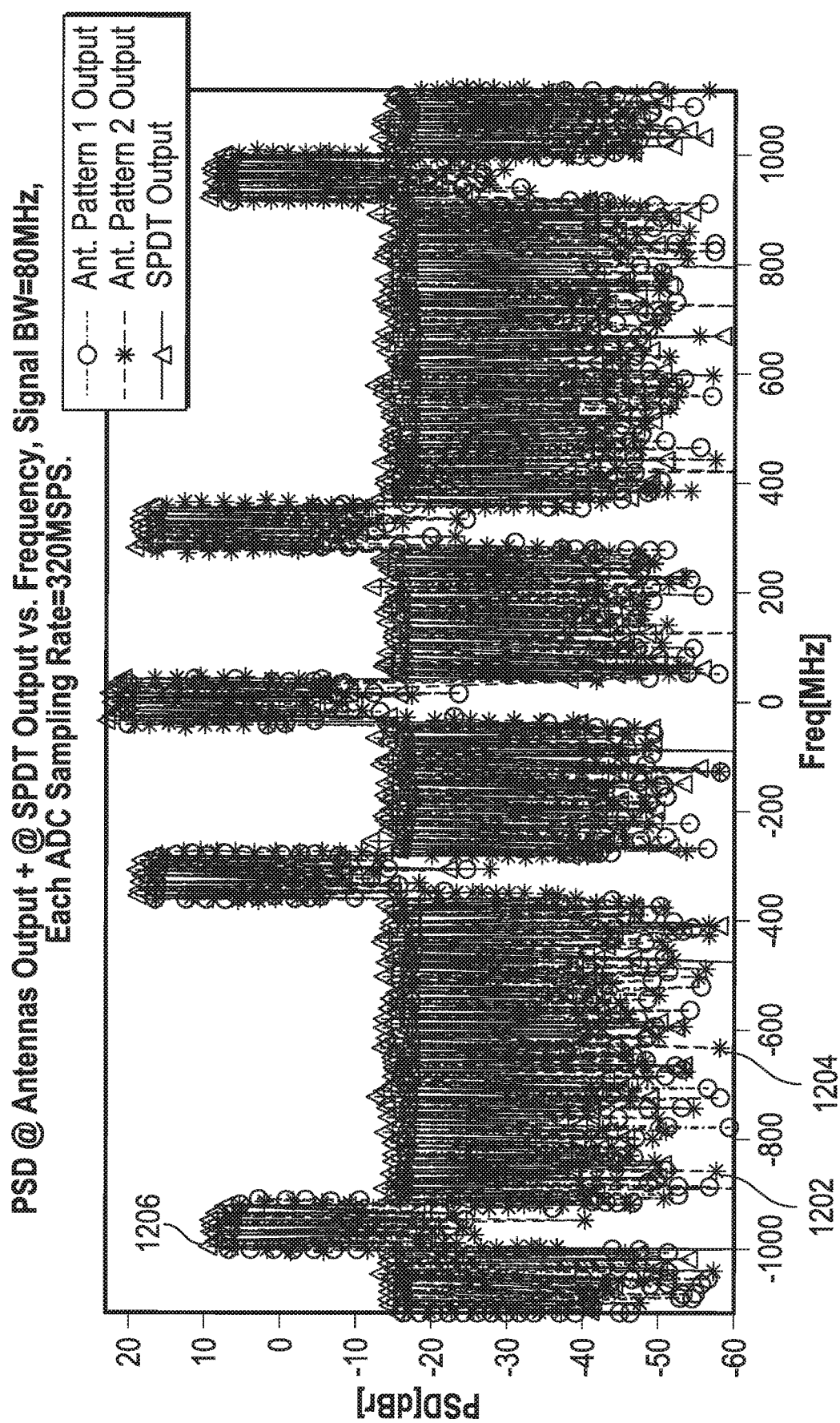
FIG. 12 illustrates power spectral density (PSD) of signals in a receive path according to some aspects.

FIG. 12 illustrates power spectral density (PSD) of signals in a receive path according to some aspects. Signal 1202 is a PSD of a first antenna pattern, for example an antenna pattern as can be received when a switch 1102 is in a first state. Signal 1204 is a PSD of a second antenna pattern, for example an antenna pattern as can be received when the switch 1102 is in a second state. Signal 1206 is a PSD of an output of switch 1102.

Other Apparatuses

Figure 13:
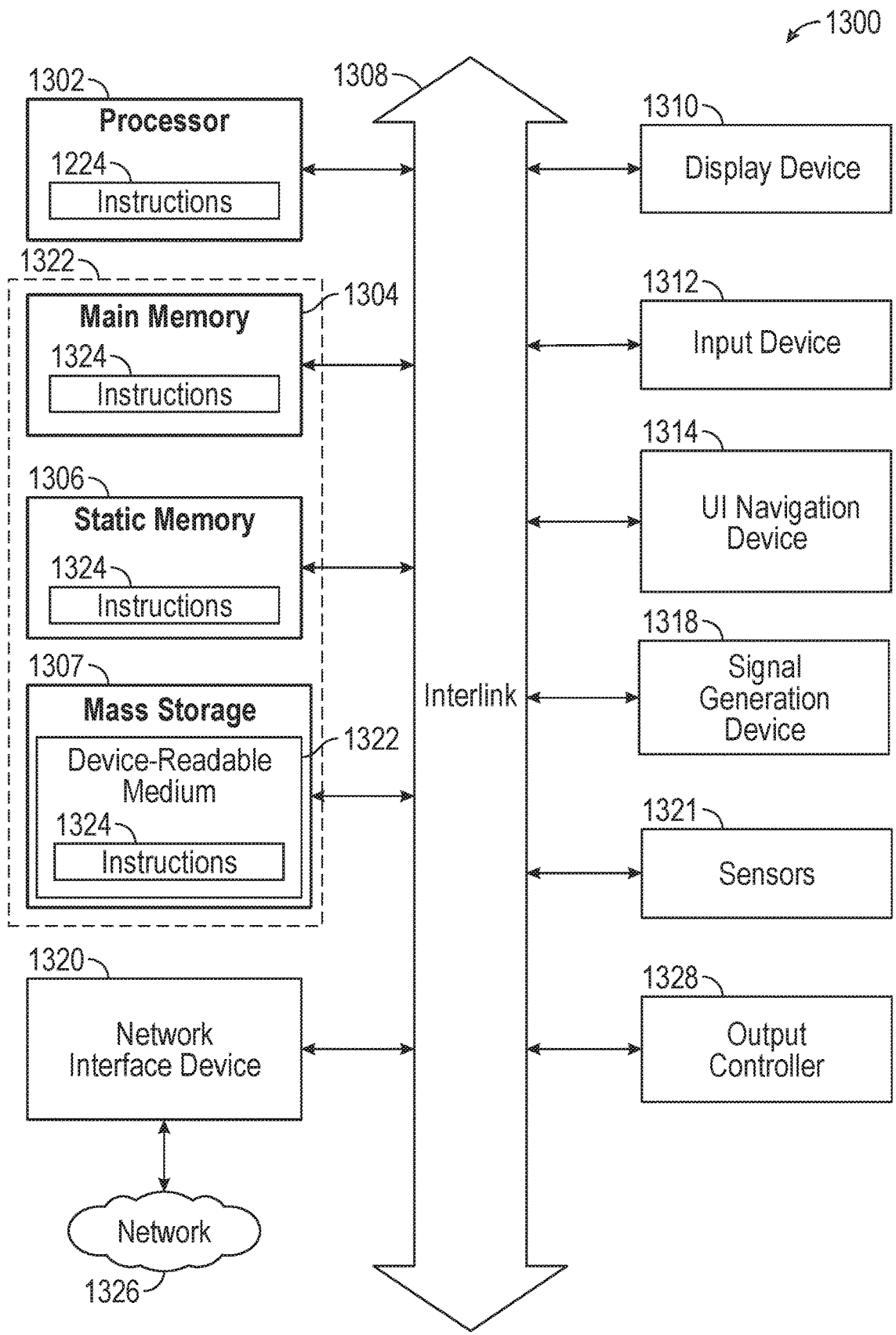
FIG. 13 illustrates a block diagram of a communication device such as a laptop, a wireless station (STA), a mobile station (MS), or a user equipment (UE), in accordance with some aspects.

FIG. 13 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 1300 may operate as a standalone device or may be connected (e.g., networked) to other communication devices.

Circuitry (e.g., processing circuitry) is a collection of circuits implemented in tangible entities of the device 1300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 3200 follow.

In some aspects, the device 1300 may operate as a standalone device or may be connected (e.g., networked) to other devices. In a networked deployment, the communication device 1300 may operate in the capacity of a server communication device, a client communication device, or both in server-client network environments. In an example, the communication device 1300 may act as a peer communication device in peer-to-peer (P2P) (or other distributed) network environment. The communication device 1300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 1300 may include a hardware processor 1302 (e.g., a central processing unit (CPU), a graphics processing unit (GPU), a hardware processor core, or any combination thereof), a main memory 1304, a static memory 1306, and mass storage 1307 (e.g., hard drive, tape drive, flash storage, or other block or storage devices), some or all of which may communicate with each other via an interlink (e.g., bus) 1308.

The communication device 1300 may further include a display device 1310, an alphanumeric input device 1312 (e.g., a keyboard), and a user interface (UI) navigation device 1314 (e.g., a mouse). In an example, the display device 1310, input device 1312 and UI navigation device 1314 may be a touchscreen display. The communication device 1300 may additionally include a signal generation device 1318 (e.g., a speaker), a network interface device 1320, and one or more sensors 1321, such as a global positioning system (GPS) sensor, compass, accelerometer, or another sensor. The communication device 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1307 may include a communication device-readable medium 1322, on which is stored one or more sets of data structures or instructions 1324 (e.g., software) embodying or utilized by any one or more of the techniques or functions described herein. In some aspects, registers of the processor 1302, the main memory 1304, the static memory 1306, and/or the mass storage 1307 may be, or include (completely or at least partially), the device-readable medium 1322, on which is stored the one or more sets of data structures or instructions 1324, embodying or utilized by any one or more of the techniques or functions described herein. In an example, one or any combination of the hardware processor 1302, the main memory 1304, the static memory 1304, or the mass storage 1316 may constitute the device-readable medium 1322.

As used herein, the term "device-readable medium" is interchangeable with "computer-readable medium" or "machine-readable medium". While the communication device-readable medium 1322 is illustrated as a single medium, the term "communication device-readable medium" may include a single medium or multiple media (e.g., a centralized or distributed database, and/or associated caches and servers) configured to store the one or more instructions 1324. The term "communication device-readable medium" is inclusive of the terms "machine-readable medium" or "computer-readable medium", and may include any medium that is capable of storing, encoding, or carrying instructions (e.g., instructions 1324) for execution by the communication device 1300 and that cause the communication device 1300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1324 may further be transmitted or received over a communications network 1326 using a transmission medium via the network interface device 1320 utilizing any one of a number of transfer protocols. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input-multiple-output (SIMO), MIMO, or multiple-input-single-output (MISO) techniques. In some examples, the network interface device 1320 may wirelessly communicate using Multiple User MIMO techniques.

The term "transmission medium" shall be taken to include any intangible medium that is capable of storing, encoding or carrying instructions for execution by the communication device 1300, and includes digital or analog communications signals or another intangible medium to facilitate communication of such software. In this regard, a transmission medium in the context of this disclosure is a device-readable medium.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own or may be combined in any permutation or combination with any one or more of the other examples provided below or throughout the present disclosure.

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus or means for performing example methods) discussed herein.

Example 1 is an apparatus of a communication device, comprising: an antenna array; and switching circuitry coupled to at least one antenna of the antenna array and configured to switch at a rate based upon a center frequency of incoming communications at the least one antenna, to generate at least two antenna patterns; and provide the at least two antenna patterns to processing circuitry; and processing circuitry configured to decode the at least two antenna patterns.

Example 2 includes the subject matter of Example 1, and further comprising control circuitry to control switching speed of the switching circuitry.

Example 3 includes the subject matter of Example 2 and optionally wherein the control circuitry is synchronized to analog-to-digital converter (ADC) circuitry of the apparatus.

Example 4 includes the subject matter of any of Examples 1-3 and optionally wherein the control circuitry is provided on a same cable as provides signals for transmission on the apparatus.

Example 5 includes the subject matter of any of Examples 1-4 and optionally wherein the control circuitry is provided on a dedicated cable of the apparatus.

Example 6 includes the subject matter of any of Examples 1-5 and optionally further comprising second switching circuitry coupled to a second antenna of the antenna array.

Example 7 includes the subject matter of any of Examples 1-6 and optionally further comprising at least two receive chains, each of the at least two receive chains to process a respective one of the antenna patterns.

Example 8 includes the subject matter of Example 7 and optionally further comprising multiplexer circuitry to provide antenna responses to each of the receive chains.

Example 9 includes the subject matter of Example 8 and optionally further including synchronization circuitry to synchronize the multiplexer circuitry and the switching circuitry.

Example 10 includes the subject matter of Example 9 and optionally wherein the synchronization circuitry is configured to synchronize by analyzing the correlation in the time domain or the frequency domain of each of the at least two received antenna patterns.

Example 11 is a device, for example a switching device, comprising an interface to couple to an antenna array; and switching circuitry coupled to at least one antenna of the antenna array and configured to: switch at a rate based upon a center frequency of incoming communications at the least one antenna, to generate at least two antenna patterns.

Example 12 includes subject matter of Example 11 and optionally further comprising an interface to front end circuitry, and wherein the switching device is further configured to provide the at least two antenna patterns to the front end circuitry over the interface.

Example 13 includes subject matter of any of Examples 11-12 and optionally wherein the switching device is further configured to receive a control signal to control switching speed.

Example 14 includes the subject matter of Example 13, and optionally wherein the control signal is received on a same cable as provides signals for transmission on an apparatus associated with the switching device.

Example 15 includes the subject matter of any of Examples 13-14, and optionally wherein the control signal is received on a dedicated cable of an apparatus associated with the switching speed.

Example 16 includes the subject matter of any of Examples 11-15 and optionally wherein the switching circuitry includes a diode.

Example 17 includes the subject matter of any of Examples 11-16 and optionally wherein the switching circuitry includes a single pull double throw (SPDT) switch.

Example 18 is a computer-readable medium including instructions that, when executing on processing circuitry of a switching device, cause the switching device to perform operations, comprising: switching at a rate based upon a center frequency of incoming communications of at least one antenna, to generate at least two antenna patterns.

Example 19 includes the subject matter of Example 18 and optionally wherein the operations further include providing the at least two antenna patterns to front end circuitry over an interface.

Example 20 includes subject matter of any of Examples 18-19, wherein the operations further include receiving a control signal to control switching speed.

Example 21 includes subject matter of Example 20 and optionally wherein the operations further include synchronization operations for synchronizing with multiplexer circuitry for multiplexing the at least two antenna patterns.

What is claimed is:

1. An apparatus of a communication device, comprising:
   an antenna array;
   processing circuitry; and
   switching circuitry coupled to the processing circuitry and at least one antenna of the antenna array, the switching circuitry configured to:
      switch at a rate based upon a signal bandwidth of incoming communications at the least one antenna, to generate at least two antenna patterns; and
      provide the at least two antenna patterns to the processing circuitry, causing the processing circuitry to decode the at least two antenna patterns based on a clock signal that is common between the processing circuitry and the switching circuitry.

2. The apparatus of claim 1, further comprising:
   control circuitry to control switching speed of the switching circuitry.

3. The apparatus of claim 2, wherein the control circuitry is synchronized to analog-to-digital converter (ADC) circuitry of the apparatus.

4. The apparatus of claim 2, wherein the control circuitry is provided on a same cable that provides signals for transmission on the apparatus.

5. The apparatus of claim 2, wherein the control circuitry is provided on a dedicated cable of the apparatus.

6. The apparatus of claim 1, further comprising:
   second switching circuitry coupled to a second antenna of the antenna array.

7. The apparatus of claim 1, further comprising at least two receive chains, each of the at least two receive chains to process a respective one of the antenna patterns.

8. The apparatus of claim 7, further comprising multiplexer circuitry to provide antenna responses to each of the receive chains.

9. The apparatus of claim 8, further including synchronization circuitry to synchronize the multiplexer circuitry and the switching circuitry.

10. The apparatus of claim 9, wherein the synchronization circuitry is configured to synchronize by analyzing a correlation in time domain or frequency domain of each of the at least two antenna patterns.

11. A switching device comprising:
    an interface to couple to an antenna array; and
    switching circuitry coupled to at least one antenna of the antenna array and configured to:
       switch at a rate based upon a signal bandwidth of incoming communications at the least one antenna, to generate at least two antenna patterns; and
       provide the at least two antenna patterns to processing circuitry, causing the processing circuitry to decode the at least two antenna patterns based on a clock signal that is common between the processing circuitry and the switching circuitry.

12. The switching device of claim 11, further comprising an interface to front end circuitry associated with the processing circuitry, and wherein the switching device is further configured to provide the at least two antenna patterns to the front end circuitry over the interface.

13. The switching device of claim 11, wherein the switching device is further configured to receive a control signal to control switching speed.

14. The switching device of claim 13, wherein the control signal is received on a same cable providing signals for transmission on an apparatus associated with the switching device.

15. The switching device of claim 13, wherein the control signal is received on a dedicated cable of an apparatus associated with the switching speed.

16. The switching device of claim 11, wherein the switching circuitry includes a diode.

17. The switching device of claim 11, wherein the switching circuitry includes a single pull double throw (SPDT) switch.

18. An apparatus of a communication device, comprising:
    an antenna array;
    processing circuitry; and
    switching circuitry coupled to the processing circuitry and at least one antenna of the antenna array, the switching circuitry configured to:
       switch at a rate based upon a signal bandwidth of incoming communications at the least one antenna, to generate at least two antenna patterns; and
       provide the at least two antenna patterns to the processing circuitry, causing the processing circuitry to decode the at least two antenna patterns,
    wherein the processing circuitry is to
       configure one or more virtual antennas for each of the at least one antenna of the antenna array based on a number of processing states associated with the switching circuitry.

19. The apparatus of claim 18, further comprising receiver circuitry, wherein the receiver circuitry is to:
    receive the at least two antenna patterns via the one or more virtual antennas.

* * * * *